Dec. 20, 1949     G. HEPP     2,491,921
STABILIZING CIRCUIT FOR FREQUENCY
MODULATED OSCILLATORS
Filed April 26, 1946

INVENTOR
GERARD HEPP
BY
AGENT

Patented Dec. 20, 1949

2,491,921

UNITED STATES PATENT OFFICE 2,491,921

STABILIZING CIRCUIT FOR FREQUENCY-MODULATED OSCILLATORS

Gerard Hepp, Eindhoven, Netherlands, assignor, by mesne assignments, to Hartford National Bank and Trust Company, Hartford, Conn., as trustee Application April 26, 1946, Serial No. 665,008
In the Netherlands March 24, 1942

Section 1, Public Law 690, August 8, 1946
Patent expires March 24, 1962

8 Claims. (Cl. 332—19)

In order to stabilize the mean frequency in frequency modulation system, it is known to utilise a comparison source of constant frequency and to derive from the difference frequency a control voltage by which the frequency of the frequency modulation wave generator is controlled.

The present invention relates to a circuit of this kind and has for its purpose to provide a circuit of a high control sensitivity accompanied by insensitivity to amplitude variations and/or distortions which occur in the system.

The invention is based on the recognition of the fact that when a condenser which is charged in one sense by the source to be frequency-controlled in such manner that a substantially constant charge is brought on the condenser per cycle, and is charged in the other sense by a constant source of direct voltage via a resistance the condenser will assume either a positive or a negative voltage, depending on whether the frequency to be controlled is greater or smaller than the desired frequency. For the present, the amplitude of the source is assumed to be constant. If provisions are made whereby the value of this source of direct voltage increases or decreases with the amplitude of the alternating voltage to be controlled, the sign of the charge of the condenser becomes independent of the last-mentioned amplitude. These effects may be obtained, for example, by causing the charge in the first-mentioned sense to be effected via a charging condenser and seeing to it that the product of the capacity of this charging condenser of the above-mentioned resistance and of the exact mean frequency=1.

In order that the invention may be more clearly understood and readily carried into effect, it will be described more fully by reference to the accompanying drawing.

Figures 1, 2:
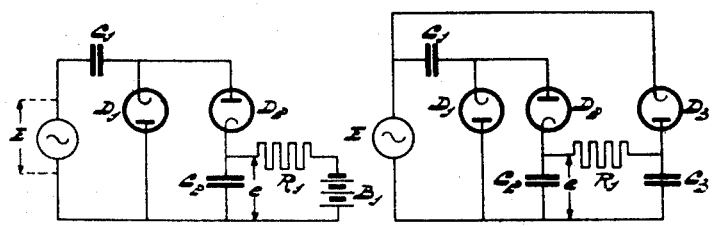
Figs. 1, 2 and 3 are diagrams to make the principle of the invention clear.

In Fig. 1, E represents the value of the alternating voltage whose frequency is to be controlled. To this end, a control condenser $C_2$ is charged in the one sense via a charging condenser $C_1$ and a diode $D_2$ and charged in the opposite sense by a battery $B_1$ via a resistance $R_1$.

A charging diode $D_1$ for the charging condenser is connected in parallel with the source of supply E and the charging condenser $C_1$.

The charge of the condenser $C_1$ increases as the frequency of E is greater, whereas the charge in the other sense is to be considered as constant. When the charging condenser $C_1$ is very small as compared with the control condenser $C_2$, the charge per cycle on $C_2$ is solely dependent on the amplitude of E.

The resulting charge of $C_2$ will be nil, when $fC_1R_1=1$, $f$ representing the frequency. When $f$ increases, $C_2$ will be charged in the one sense, and when $f$ decreases, $C_2$ will be charged in the opposite sense. The voltage $e$ which appears across $C_2$ may consequently be used as the control voltage.

Meanwhile in the case here considered the voltage $e$ will also depend on the amplitude value of E which can never be considered wholly constant even with the use of a limiter. A device for making $e$ also independent of amplitude variations of E is shown in Fig. 2. This device differs from Fig. 1 in that the constant source of voltage $B_1$ is now also made variable in accordance with the amplitude value E, since the battery $B_1$ is replaced by a condenser $C_3$ which is charged by the source of voltage to be controlled through a diode $D_3$. Thus, the charge of the control condenser $C_2$ in both senses is made dependent on the amplitude of the voltage E, the variations in amplitude are nullified and have little or no influence on the sign of the control voltage $e$.

Figure 3:
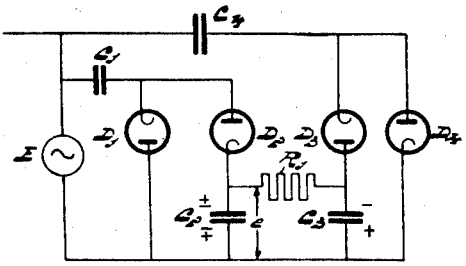

In the foregoing it has always been assumed that the voltage E is exactly sinusoidal, at least symmetrical relatively to the zero line. In reality this will not generally be the case. In order to make the control voltage independent of irregularities, the zero line may be displaced upwardly or downwardly until it becomes a tangent of the voltage curve. In Fig. 3 this is obtained by means of a condenser $C_4$ and a diode $D_4$.

The condenser $C_2$, together with the two series-connected diodes $D_1$ and $D_2$, is located in a closed circuit and may consequently be charged in one direction only, since charges of opposite sign immediately leak away through the diodes. To correct this effect a counter E. M. F. may be included somewhere in the circuit. In this case, however, the voltage which occurs across the condenser $C_2$ with the desired value of the frequency would not be equal to zero, as is most desirable for the control, unless an E. M. F. of equal value is switched-in on charging in the opposite sense.

Figure 4:
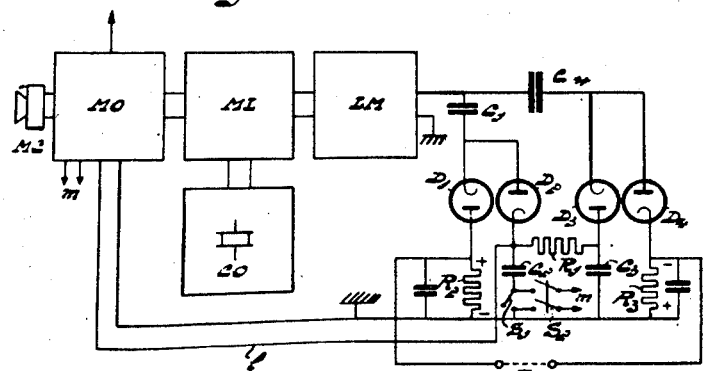
Fig. 4 shows a constructional example thereof.

A device serving thereto is shown in Fig. 4.

In the anode conductor of the diode $D_1$ and in the cathode conductor of the diode $D_4$ there are included resistances $R_2$ and $R_3$ of equal value, which are shunted by smoothing condensers, These resistances are traversed by a current originating from a source $B_2$ of direct voltage and this in the opposite sense. Immaterial as to how great the value is of $B_2$ and whether this value remains constant, the condenser $C_2$ will not acquire any charge at the center frequency and with a deviation from this frequency will acquire a charge variable with the direction of this deviation in the one or in the other sense.

For obtaining a quick sensitive control the condenser $C_2$ must not be given a too high value which involves however, on the one hand the danger that also the lower modulating frequencies must be suppressed, while on the other hand, the mean value of the voltage set up at $C_2$ becomes incorrect due to asymmetry. To obviate this drawback, these low modulating frequencies may be supplied once more in addition to the condenser $C_2$ or be connected in series therewith. To this end a switch $S_1$ may be opened and a double-pole switch $S_2$ be closed with the result that through a conductor $m$ the lower modulating frequencies derived from the modulator part of the modulating oscillator MO via filter (not shown) are connected in series with the condenser $C_2$.

This oscillator is frequency-modulated by a microphone MC, the central frequency being maintained constant with the aid of the control voltage set up across the condenser $C_2$ and supplied to the oscillator through a conductor $l$. A crystal oscillator CO which in a mixing-stage ML with the oscillations of MO generates oscillations having the difference frequency serves as a comparison source. These oscillations are supplied via a limiter LM to the above-described portion of the circuit, where the control voltage for the oscillator is derived therefrom.

By way of example the following numerical values are given for the different circuit elements of Fig. 4:

| | |
|---|---|
| Mean frequency $f_m$ | 69,000 cycles/sec. |
| Condenser $C_1$ | 0.005 $\mu F$ |
| Condenser $C_2$ | 0.1 $\mu F$ |
| Condenser $C_3$ | 1 $\mu F$ |
| Condenser $C_4$ | 24 $\mu F$ |
| Resistance $R_1$ | 600,000 ohms |
| Resistance $R_2$ | 4,700 ohms |
| Resistance $R_3$ | 4,700 ohms |
| Voltage $B_2$ | 10 volts |

I claim:

1. A circuit arrangement for stabilizing the mean frequency of a frequency-modulated wave at a predetermined center frequency, comprising a control capacitor, means to cyclically charge said control capacitor in one sense to a given value, means responsive to said frequency-modulated wave to cyclically charge said capacitor in the opposite sense to a second value proportional to the instantaneous mean frequency of said frequency-modulated wave during alternate half wave periods of said wave, and means responsive to the resulting charge difference on said capacitor to return the instantaneous mean frequency to the predetermined center frequency of said frequency-modulated wave.

2. A circuit arrangement for stabilizing the mean frequency of a frequency-modulated wave at a predetermined center frequency, comprising a control capacitor, means to cyclically charge said control capacitor in one sense to a predetermined value, means responsive to said frequency-modulated wave to cyclically charge said capacitor in the opposite sense to a second value proportional to the instantaneous mean frequency of said frequency-modulated wave during alternate half wave periods of said wave, said second value being equal to said predetermined value at said center frequency, and means responsive to the resulting charge difference on said capacitor to return the instantaneous mean frequency to the predetermined center frequency of said frequency-modulated wave.

3. A circuit arrangement for stabilizing the mean frequency of a frequency-modulated wave at a predetermined center frequency, comprising a control capacitor, means to derive a potential proportional to the amplitude of said frequency-modulated wave, means to apply said potential to cyclically charge said control capacitor in one sense to a first value, means responsive to said frequency-modulated wave to cyclically charge said capacitor in the opposite sense to a second value proportional to the amplitude and to the instantaneous mean frequency of said frequency-modulated wave during alternate half wave periods of said wave, and means responsive to the resulting charge difference on said capacitor to return the instantaneous mean frequency to the predetermined center frequency of said frequency-modulated wave.

4. A circuit arrangement for stabilizing the mean frequency of a frequency-modulated wave at a predetermined center frequency, comprising a control capacitor, means to derive a first potential proportional to the amplitude of said frequency-modulated wave, means to apply said first potential to cyclically charge said control capacitor in one sense to a first value, means comprising a charging capacitor and a rectifier connected in series to derive a second potential proportional to the amplitude and to the instantaneous mean frequency of said frequency-modulated wave, the capacity of said charging capacitor being low with respect to the capacity of said control capacitor, means comprising a second rectifier poled opposite to said first rectifier to discharge said charging capacitor, means to apply said second potential to cyclically charge said control capacitor in the opposite sense to a second value during alternate half wave periods of said wave, and means responsive to the resulting charge difference on said control capacitor to return the instantaneous mean frequency to the predetermined center frequency of said frequency-modulated wave.

5. A circuit arrangement for stabilizing the mean frequency of a frequency-modulated wave at a predetermined center frequency, comprising a control capacitor, means to derive a first potential proportional to the amplitude of said frequency-modulated wave, means to apply said first potential to cyclically charge said control capacitor in one sense to a first value, means comprising a charging capacitor and a rectifier connected in series to derive a second potential proportional to the amplitude and to the instantaneous mean frequency of said frequency-modulated wave, the capacity of said charging capacitor being low with respect to the capacity of said control capacitor, means comprising a second rectifier poled opposite to said first rectifier to discharge said charging capacitor, a source of voltage operative in opposition to said second rectifier, means to apply said second potential to cyclically charge said control capacitor in the opposite sense to a second value, and means responsive to the resulting charge difference on said control capacitor to return the instantaneous mean frequency to the predetermined center frequency of said frequency-modulated wave.

6. A circuit arrangement for stabilizing the mean frequency of a frequency-modulate wave at a predetermined center frequency, comprising a control capacitor, means comprising a first rectifier and a second capacitor connected in series to derive a first potential proportional to the amplitude of said frequency-modulated wave, a second rectifier poled opposite to said first rectifier and shunted across said series combination of said first rectifier and said second capacitor, a first source of direct voltage operative in opposition to said second rectifier, means including a resistor to apply said first potential to cyclically charge said control capacitor in one sense to a first value, means comprising a charging capacitor and a third rectifier connected in series to derive a second potential proportional to the amplitude and to the instantaneous mean frequency of said frequency-modulated wave, the capacity of said charging capacitor being low with respect to the capacity of said control capacitor, means comprising a fourth rectifier poled opposite to said third rectifier to discharge said charging capacitor, a second source of direct voltage operative in opposition to said fourth rectifier, means to apply said second potential to cyclically charge said control capacitor in the opposite sense to a second value, and means responsive to the resulting charge difference on said control capacitor to return the instantaneous mean frequency to the predetermined center frequency of said frequency-modulated wave.

7. A circuit arrangement for stabilizing the mean frequency of a frequency-modulated wave at a predetermined center frequency, comprising a control capacitor, means comprising a first rectifier and a second capacitor connected in series to derive a first potential proportional to the amplitude of said frequency-modulated wave, a second rectifier poled opposite to said first rectifier and shunted across said series combination, means including a first resistor to apply said first potential to cyclically charge said control capacitor in one sense to a first value, means comprising a charging capacitor and a third rectifier connected in series to derive a second potential proportional to the amplitude and to the instantaneous mean frequency of said frequency-modulated wave, the capacity of said charging capacitor being low with respect to the capacity of said control capacitor, means comprising a fourth rectifier poled opposite to said third rectifier to discharge said charging capacitor, a second resistor, a third resistor having a value equal to that of said second resistor and connected in series therewith, a source of direct voltage connected across said first and said second resistors, means to apply the voltage drop across said second resistor in opposition to said second rectifier, means to apply the voltage drop across said third resistor in opposition to said fourth rectifier, means to apply said second potential to cyclically charge said control capacitor in the opposite sense to a second value, and means responsive to the resulting charge difference on said control capacitor to return the instantaneous mean frequency to the predetermined center frequency of said frequency-modulated wave.

8. A circuit arrangement for stabilizing the mean frequency of a frequency-modulated wave at a predetermined center frequency, comprising a source of modulating voltages covering a band of frequencies, means to select those modulating voltages appearing in the lowermost end of the band of frequencies, a control capacitor, means to drive a first potential proportional to the amplitude of said frequency-modulated wave, means to apply said first potential to cyclically charge said control capacitor in one sense to a first value, means comprising a charging capacitor and a rectifier connected in series to derive a second potential proportional to the amplitude and to the instantaneous mean frequency of said frequency-modulated wave, the capacity of said charging capacitor being low with respect to the capacity of said control capacitor, means comprising a second rectifier poled opposite to said first rectifier to discharge said charging capacitor, means to apply said second potential to cyclically charge said control capacitor in the opposite sense to a second value, means to apply said selected modulating voltages in series with the charge on said control capacitor, and means responsive to the algebraic sum of the resulting charge difference on said control capacitor and said selected modulating voltages to return the instantaneous mean frequency to the predetermined center frequency of said frequency-modulated wave.

GERARD HEPP.

REFERENCES CITED

The following references are of record in the file of this patent:

UNITED STATES PATENTS

| Number | Name | Date |
|---|---|---|
| 1,958,994 | Green | May 15, 1934 |
| 2,131,443 | Kummerer et al. | Sept. 27, 1938 |
| 2,214,573 | Booth | Sept. 10, 1940 |
| 2,279,660 | Crosby | Apr. 14, 1942 |
| 2,335,796 | Schraeder et al. | Nov. 30, 1943 |